United States Patent
Xu et al.

(10) Patent No.: US 9,307,002 B2
(45) Date of Patent: Apr. 5, 2016

(54) METHOD AND DEVICE FOR DELIVERING 3D CONTENT

(75) Inventors: Yan Xu, Beijing (CN); Lin Du, Bejing (CN); Jianping Song, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 182 days.

(21) Appl. No.: 14/128,549

(22) PCT Filed: Jun. 24, 2011

(86) PCT No.: PCT/CN2011/076276
§ 371 (c)(1),
(2), (4) Date: Dec. 20, 2013

(87) PCT Pub. No.: WO2012/174739
PCT Pub. Date: Dec. 27, 2012

(65) Prior Publication Data
US 2014/0136728 A1    May 15, 2014

(51) Int. Cl.
*H04L 29/06*   (2006.01)
*H04N 13/00*   (2006.01)
*H04N 21/81*   (2011.01)

(52) U.S. Cl.
CPC .......... *H04L 65/608* (2013.01); *H04N 13/0059* (2013.01); *H04N 13/0066* (2013.01); *H04N 21/816* (2013.01)

(58) Field of Classification Search
None
See application file for complete search history.

(56) References Cited

U.S. PATENT DOCUMENTS

| | | | |
|---|---|---|---|
| 2002/0023166 A1* | 2/2002 | Bar-Noy | H04L 29/06027 709/231 |
| 2007/0041444 A1 | 2/2007 | Gutierrez Novelo | |
| 2007/0266170 A1* | 11/2007 | Mockett | H04N 21/4622 709/231 |
| 2008/0310499 A1* | 12/2008 | Kim et al. | 375/240.01 |
| 2010/0058406 A1 | 3/2010 | Xu et al. | |
| 2010/0118120 A1 | 5/2010 | Takahashi et al. | |

(Continued)

FOREIGN PATENT DOCUMENTS

| CN | 1954606 | 4/2007 |
|---|---|---|
| CN | 101578887 | 11/2009 |

(Continued)

OTHER PUBLICATIONS

Sjostrom et al., "Performance of scalable coding in depth domain", Proceedings of SPIE Stereoscopic Displays and Applications XXI, vol. 75240, Feb. 18, 2010, pp. 1-11.

(Continued)

*Primary Examiner* — Nicholas Taylor
*Assistant Examiner* — Clayton R Williams
(74) *Attorney, Agent, or Firm* — Tutunjian & Bitetto, P.C.

(57) ABSTRACT

It is provided a method for delivering a 3D content comprising a 2D part and a metadata part which are divided into equal number of segments and are transmitted in two multicast streams, the method comprising the steps of receiving a request for the 3D content with a starting time point corresponding to a starting segment of the 2D part and a starting segment of the metadata part; and scheduling the transmission of at least one segment of the 2D part including the starting segment of the 2D part in a first multicast stream and the transmission of at least one segment of the metadata part including the starting segment of the metadata part in a second multicast stream, wherein, the transmission of the starting segment of the 2D part and the transmission of the starting segment of the metadata part are synchronized.

4 Claims, 5 Drawing Sheets

(56) References Cited

U.S. PATENT DOCUMENTS

| | | |
|---|---|---|
| 2010/0325676 A1 | 12/2010 | Kim et al. |
| 2011/0066746 A1* | 3/2011 | Bennett ............ H04N 21/26616 709/231 |
| 2011/0106961 A1* | 5/2011 | Glasser et al. ................. 709/231 |
| 2011/0164111 A1* | 7/2011 | Karaoguz et al. ................ 348/43 |

FOREIGN PATENT DOCUMENTS

| | | |
|---|---|---|
| CN | 101742345 | 6/2010 |
| EP | 2334093 | 6/2011 |
| JP | 2006108831 | 4/2006 |
| WO | WO2005114998 | 12/2005 |
| WO | WO2008069613 | 6/2008 |
| WO | WO2010010077 | 1/2010 |
| WO | WO2011013995 | 2/2011 |
| WO | WO2011056473 | 5/2011 |
| WO | WO2011062572 | 5/2011 |

OTHER PUBLICATIONS

Tekalp et al., "3DTV over IP," IEEE Signal Processing Magazine, vol. 24, No. 7, Nov. 2007, pp. 77-87.

Hladka etal., "Stereoscopic Video over IP Networks", Autonomic and Autonomous Systems and International Conference on Networking and Services, Papeete, Tahiti, Oct. 23, 2005, pp. 1-6.

Lee et al., "A Two Step Scheduling Algorithm to Support Dual Bandwidth Allocation Policies in an Ethernet Passive Optical Network", ETRI Journal, vol. 26, No. 2, Apr. 2004, pp. 185-188.

* cited by examiner

METHOD AND DEVICE FOR DELIVERING 3D CONTENT

This application claims the benefit, under 35 U.S.C. §365 of International Application PCT/CN2011/076276, filed Jun. 24, 2011, which was published in accordance with PCT Article 21(2) on Dec. 27, 2012 in English.

TECHNICAL FIELD

The present invention relates to network communication, and more particularly, relates to a method and a device for delivering 3D content.

BACKGROUND

Video on Demand (VoD) or Audio and Video on Demand (AVoD) system allows clients to select and play video or audio content on demand. IPTV technology is often used to bring video on demand to televisions and personal computers. Sometimes, the limited transmission resource, such as bandwidth etc. at the side of VoD server does not allow for a large scale of clients simultaneously.

In order to more efficiently make use of the limited resource, a solution is described in the published PCT application WO2008083523, which provides a scheduling method for a VoD server of 2D video content (or 2D content to shorten the description). A 2D content is divided into pluralities of portions or blocks. The method reschedules the transmission of portions of a requested 2D content for a requesting client and uses multicast to transmit, so that some portions can be shared among those clients requesting the same 2D content. Specifically, the method comprises the steps of receiving a request for a 2D content and generating a schedule for delivering the 2D content with a first delay for an initial portion of the 2D content and with a second delay for a subsequent portion of the 2D content. The step of generating the schedule comprises selecting a first delay to minimize the time period from receiving the request to delivering of the initial portion of the 2D content, and selecting the second delay to satisfy a delay parameter associated with the request while also increasing a delay for starting delivering the subsequent portions. Herein, the second delay makes subsequent portions be transmitted as late as possible but it shall be selected in such a way that the content received by the client's side can be played continuously or at least without unacceptable interruptions.

In 3D systems, a left eye view and a right eye view (or called left view and right view) at the client side are used together to generate a stereoscopic view. In order to transmit the left view and the right view to the client side, the most straightforward way is to transmit the left and right eye views as completely independent data streams. An alternative is to transmit 2D video plus metadata, and the metadata represents the information in the third dimension.

There are 2 types of 2D plus metadata: 2D plus Delta (or 2D plus Difference) and 2D plus Depth (or 2D+Z). With regard to 2D plus Delta, it is a standard-listed methodology as part of MPEG2, and MPEG4, specifically on the H.264 implementation of Multi-view Video Coding extension. It utilizes the left view or right view (sometimes they are also called left channel and right channel) as the 2D version (or called 2D part) and the optimized difference or disparity (Delta) between left and right views is injected into the video stream as client data, secondary stream, independent stream, or enhancement layer. So with the 2D version and the Delta, a stereoscopic view can be generated. The Delta data can be either a spatial stereo disparity, temporal predictive, bidirectional or optimized motion compensation. With regard to 2D plus Depth, each 2D image frame is supplemented with a depth map which indicates if a specific pixel in the 2D image needs to be shown in front of or behind the screen plane. The 2D plus Depth is supported by the MPEG standards. MPEG-C part 3 allows depth map to be treated as "auxiliary video" and compressed with existing video coding techniques (e.g. H.264/AVC).

In 3D systems, the most used format is 2D plus metadata which can be easily integrated into existing content distribution and management systems, such as VoD via cable, satellite, Internet or terrestrial broadcasting. And it is backwards compatible with legacy 2D set-top boxes and is independent of display format. In these 3D systems, 2D and metadata are usually multiplexed and transmitted through a single channel or data stream. Therefore, 3D VoD service can be easily provided by using some existing 2D content delivery systems. Many companies provide 3D VoD service in this way, such as Numericable, Virgin Media, Philip, etc.

Transmitting 2D plus metadata in two different channels or data streams allows coexistence of 2D video player and 3D video player. A viewer who has a 2D video player will only receive 2D data and view the 2D video normally. He can choose whether to receive the associated metadata or not, which is impossible if 2D and metadata are multiplexed. A viewer who has a 3D video player will receive both 2D data and metadata.

But the conventional methods for transmitting 2D plus metadata do not efficiently make use of the bandwidth, thus, it is desired a method to efficiently transmit the 3D content among clients requesting the same 3D content.

SUMMARY

According to an aspect of the invention, it is provided a method for delivering a 3D content comprising a 2D part and a metadata part which are divided into equal number of segments and are transmitted in two multicast streams, the method comprising the steps of receiving a request for the 3D content with a starting time point corresponding to a starting segment of the 2D part and a starting segment of the metadata part; and scheduling the transmission of at least one segment of the 2D part including the starting segment of the 2D part in a first multicast stream and the transmission of at least one segment of the metadata part including the starting segment of the metadata part in a second multicast stream, wherein, the transmission of the starting segment of the 2D part and the transmission of the starting segment of the metadata part are synchronized.

According to another aspect of the invention, it is provided a device for delivering a 3D content upon request from a starting time point, the 3D content comprising a 2D part and a metadata part which are divided into equal number of segments, the device comprising: a 2D scheduling module (102) for scheduling the transmission of at least one segment of the 2D part including a starting segment of the 2D part corresponding to the starting time point of the 3D content, in a first multicast stream; and a metadata scheduling module (103) for scheduling the transmission of at least one segment of the metadata part including a starting segment of the metadata part corresponding to the starting time point of the 3D content, in a second multicast stream, wherein, the 2D scheduling module (102) and the metadata scheduling module (103) synchronize the transmission of the starting segment of the 2D part and the transmission of the starting segment of the metadata part.

More aspects and advantages of the invention will be found in the following detailed description of the present invention with accompanying drawings. It is to be understood that the following description relates to embodiments which are not limitative to the scope of the invention.

DETAILED DESCRIPTION

An embodiment of the present invention will now be described in detail in conjunction with the drawings. In the following description, some detailed descriptions of known functions and configurations may be omitted for clarity and conciseness.

The invention aims to efficiently transmit 3D videos in a 3D VoD system, where the 2D part and the metadata part of 3D video are transmitted through two independent channels or data streams.

Figure 1:
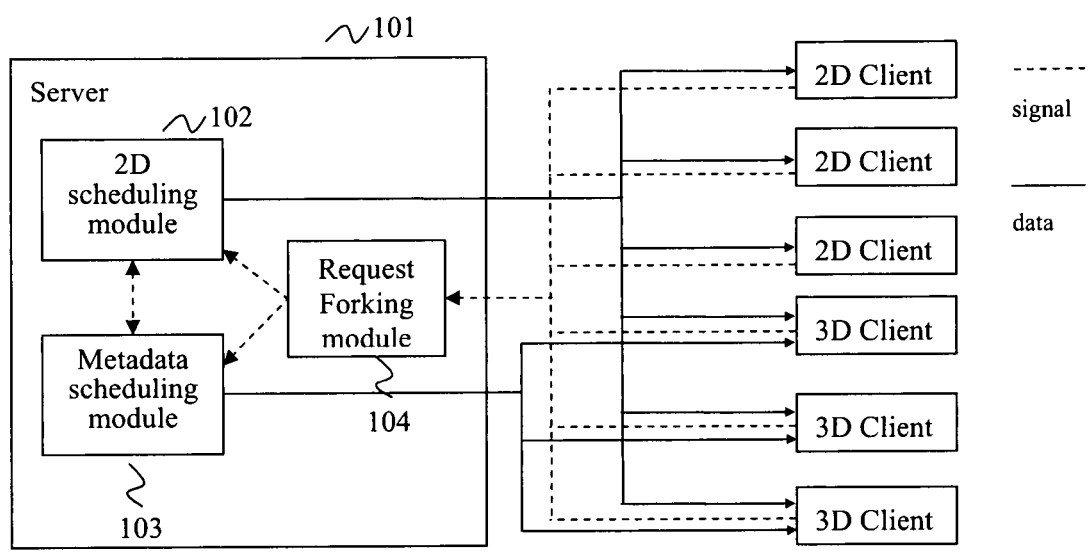
FIG. 1 is a diagram showing a system for delivering content for 2D clients and 3D clients according to an embodiment of present invention.

FIG. 1 is a diagram showing a system for delivering content for 2D clients and 3D clients according to an embodiment of present invention. In the figure, the dash lines represent the flow for the signal, such as requests for 2D or 3D videos, and the solid lines represent the flow for data, such as data of the 2D part and the metadata part. The system comprises a VoD server 101 for scheduling the transmission for 2D videos and 3D videos in a VoD system and a plurality of devices representing 2D clients and 3D clients. The VoD server 101 comprises a 2D scheduling module 102, a metadata scheduling module 103 and a request forking module 104. They function as follows:

the request forking module 104 is used to receive requests from 2D clients and 3D clients, and forward the received requests to the 2D scheduling module 102 and the metadata scheduling module 103 accordingly. That is, if a 2D client or a 3D client makes a request for a 2D video, the request will be forwarded to the 2D scheduling module 102 by the request forking module 104; and if a 3D client makes a request for a 3D video, the request will be forwarded to both the 2D scheduling module 102 and the metadata scheduling module 103 by the request forking module 104.

the 2D scheduling module 102 is used to determine an interim schedule and a finalized schedule for delivering 2D part for a client upon receipt of a request for 2D video or 3D video from the client; and the metadata scheduling module 103 is used to determine an interim schedule and a finalized schedule for delivering metadata part for a client upon receipt of a request for 3D video from the client.

Herein, upon receipt of a request for a 2D video, only the 2D scheduling module 102 operates to determine an interim schedule for delivering the 2D part of a corresponding 3D video. And the interim schedule is used by the server as a finalized schedule to schedule the delivery of the 2D part. Upon receipt of a request for a 3D video, the 2D scheduling module 102 and the metadata scheduling module 103 operate independently to determine two interim schedules for the 2D part and the metadata part, and operate collaboratively to determine two finalized schedules for the 2D part and the metadata part based on the two interim schedules (details will be described below), and the server will use the two finalized schedules to schedule the transmission of the 2D part and the metadata part.

Figure 2:
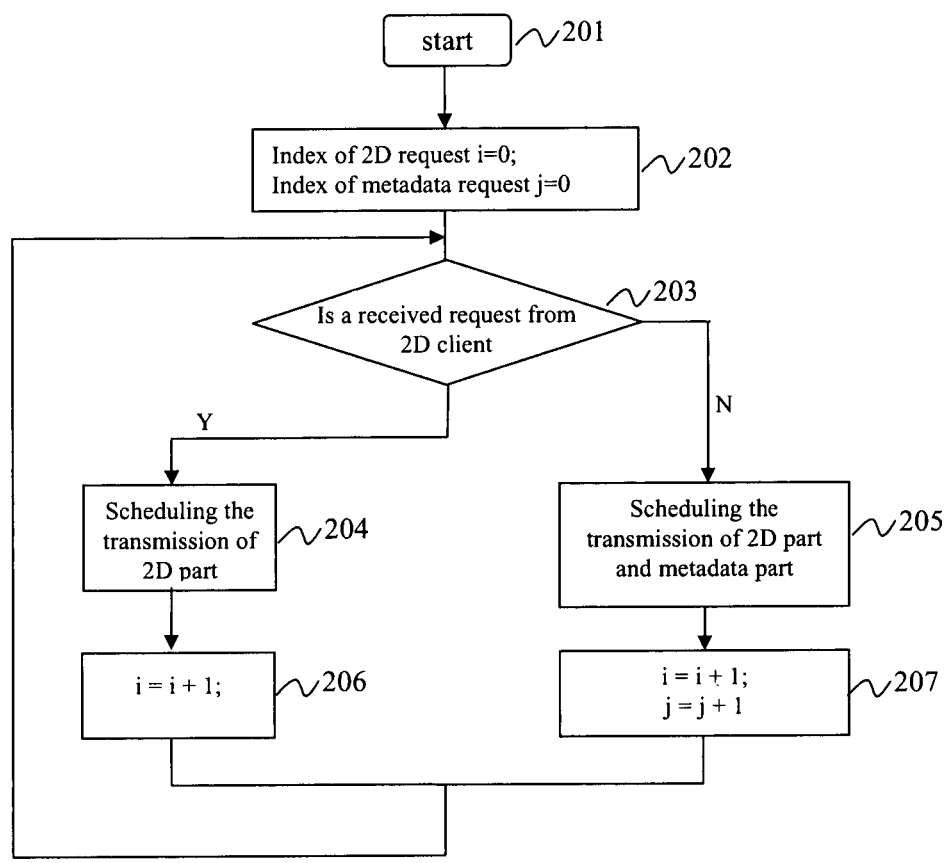
FIG. 2 is a diagram showing an example of scheduling process according to the embodiment of present invention.

FIG. 2 is a diagram showing an example of scheduling process according to the embodiment of present invention. The objectives are to provide 1) a minimum startup delay between the receipt of the request and the start of the delivery of the content; and 2) a maximum degree of bandwidth sharing among clients requesting the same content.

As shown in the FIG. 2, the process begins at the step 201, and goes to the step 202. In the step 202, the index of 2D request i and the index of metadata request j for a same content are set to zero, and then goes to the step 203. In the step 203, the server listens to requests from clients. It goes to the step 204 if it is a request for a 2D content from a 2D client, and it goes to the step 205 if it is a request for a 3D content from a 3D client. In the step 204, the server determines a schedule (i.e. finalized schedule) for the 2D client and schedules the transmission of the 2D content based on the determined schedule, and it then goes to step 206. In the step 206, the index of 2D request i is increased by 1, and the process then goes to the step 203. In the step 205, the server determines for the 3D client two schedules respective for the 2D part and the metadata part of a 3D content, and schedules the transmission of the 2D part and the metadata part based on the two determined schedules; and it goes to the step 207. In the step 207, the index of 2D request and the index of metadata request are increased by 1 respectively; and the process goes to the step 203.

According to the principle of present invention, the method described above allows 3D clients (i.e. clients that watch 3D content) sharing bandwidth with 2D clients for the 2D part by using multicast. In addition, for either 2D part or metadata part, the data of it is shared among clients watching the same content by using multicast. So the need for bandwidth of the server is decreased.

In the method described above, regarding the determination of a schedule for a 2D content for a 2D client, the method described in the WO2008083523 can be used. This is because the 2D part and the metadata part are transmitted in separate multicast streams. The transmission of the 2D part that is requested by the 2D client does not need synchronizing with the transmission of the metadata part because the 2D client does not need the metadata to generate stereoscopic view.

In addition, regarding the determination of a schedule for a 3D content for a 3D client, the transmission of the 2D part and the metadata part needs synchronizing, i.e. the segments with same sequence number in the 2D part and the metadata part of a 3D content need to be transmitted at a same time point or at two time points with tolerable difference for the client to generate stereoscopic view. Otherwise, the 3D client can't generate the stereoscopic view based on the 2D part and the metadata part.

Figure 3:
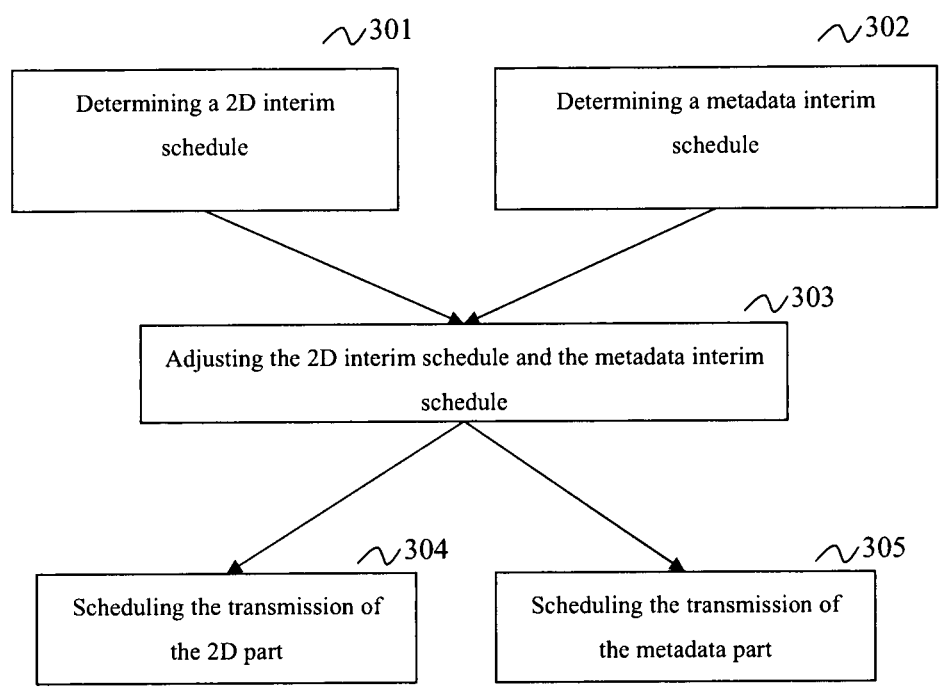
FIG. 3 is a diagram showing a method for scheduling transmission of the 2D part and the metadata part of a 3D content according to the embodiment of present invention.

FIG. 3 is a diagram showing a method for scheduling transmission of the 2D part and the metadata part of a 3D content according to the embodiment of present invention. The objective is to lessen bandwidth requirement and minimize the startup delay for the 3D content transmission with synchronized multicast streams for 2D content part and for metadata part. The method may be added to the one described above.

To improve clarity, several concepts and definitions are given below.

Segment: Supposing the 2D part for a 3D content is logically divided into N segments, all segments have equal size (i.e. time length); the metadata part for the same 3D content is also divided into N segments with all having equal size. Herein, the number of segments determines the granularity of the scheduling scheme.

Bandwidth limit: Supposing the transmission bandwidth for a 2D part and metadata part at the server side is limited. The bandwidth limit is denoted as multiple number of the average rate. The average rate of 2D part denotes as b_2D; and the average rate of metadata part denotes as b_metadata.

Stream and request: a stream (Si) is a set of selected segments for a given content with a schedule for transmission in response to a request (Ri). When a 2D client makes a request, the request will be forwarded to the 2D scheduling module. And the server will schedule a stream accordingly. The scheduled stream indicates when and which segments will be transmitted. Every request for a 2D content from a 2D client corresponds to a scheduled stream. When a 3D client makes a request, the request will be forwarded to the 2D scheduling module and the metadata scheduling module. The server will schedule two streams for the request, one for the 2D part, and the other for metadata part. Every request for a 3D content from a 3D client corresponds to two scheduled streams.

Timeslot: a timeslot is the duration of time that fits a segment. Segments corresponding to a same timeslot are transmitted at the same time. Every time-slot can "hold" specific number of segments (i.e. its capacity, which is determined by the Bandwidth Limit). If a time-slot needs to "hold" more segments than its capacity, the time slot is referred to as an over-load timeslot; while if a time slot needs to "hold" fewer segments than its capacity, the time slot is referred to as an under-load timeslot. For example, supposing a timeslot is 1 s and within a timeslot 5 segments can be transmitted at the maximum; if at a particular timeslot, a transmitter needs to transmit more than 5 segments, then this timeslot is an over-load timeslot; otherwise, if less than 5 segments are needed to be transmitted, the timeslot is an under-load timeslot.

In the steps 301 and 302 as shown in the FIG. 3, upon receipt of a request for a 3D content, the server determines an interim schedule for the 2D part of the 3D content (we call it 2D interim schedule) and an interim schedule for the metadata part of the 3D content (we call it metadata interim schedule). Specifically, in the step 301, besides the determination of the subsequent transmission time point(s), the server determines a minimum startup delay for the 2D part of the requested 3D content, i.e. the first time point for the 2D part, based on the bandwidth limit. We denote it as d_2D. After the shift, the minimum initial delay $d_k$ for the request $R_k$ can be determined. Let the time points for delivering the segments in the interim schedule be presented as $U=\{u_{k1}, u_{k2}, \ldots, u_{ky}\}$, the time points for delivering the segments after the segment shift be presented as $V=\{v_{k1}, v_{k2}, \ldots, v_{ky}\}$, we have $$d_k = \max\left\{0, \max_{i \in [1,y]}\{v_{ki} - u_{ki}\}\right\} \text{ and } d\_2D = d_k.$$

In the step 302, besides the determination of the subsequent transmission time point(s), the server determines a minimum startup delay for metadata part of the requested 3D content, i.e. the first time point for the metadata part based on the bandwidth limit. We denote it as d_metadata. For the first metadata request, a continuous multicast stream with all segments of the metadata part is arranged. If the associated 2D request is not the first 2D request (e.g. R1/R1_3D client), the scheduled continuous stream for the metadata part will be delayed for d_2D. For the non-first metadata request, its determination is similar to non-first 2D request.

In the step 303, the server adjusts the 2D interim schedule and the metadata interim schedule to generate a 2D finalized schedule and a metadata finalized schedule for the requested 3D content. Specifically, the server determines a unified minimum startup delay d_min (or called unified first time point for both the 2D part and the metadata part) by selecting the larger one between d_2D and d_metadata.

d_min=max{d_2D,d_metadata}

As to the 2D part, the 2D finalized schedule is obtained by the following. First, the 2D interim schedule is delayed with d_min, i.e. the time points for the transmission of segments are presented as Uk'={$u_{k1}$+d_min, $u_{k2}$+d_min, . . . , $u_{ky}$+d_min}.

As to the metadata part, the metadata finalized schedule is obtained in a similar way as the 2D finalized schedule.

In the steps 304 and 305, the server schedules the transmission of the 2D part based on the 2D finalized schedule and the transmission of the metadata part based on the metadata finalized schedule.

Figure 4A:
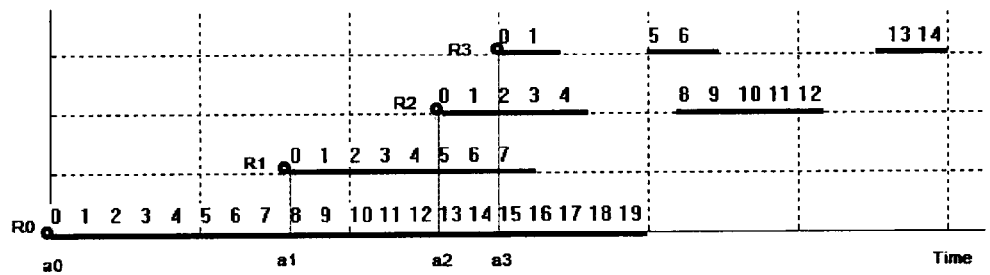
FIGS. 4A and 4B are diagrams showing examples of the 2D interim schedule and the metadata interim schedule according to the embodiment of present invention.
Figure 4B:
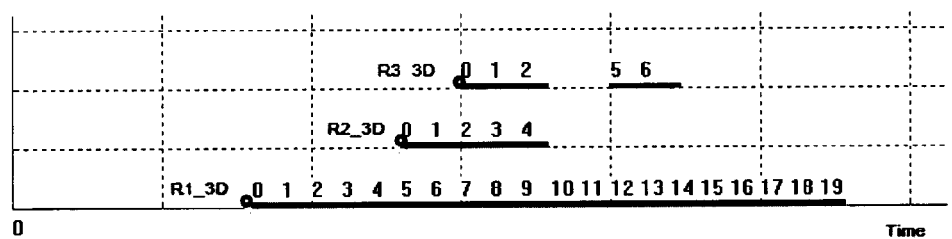
Figure 5A:
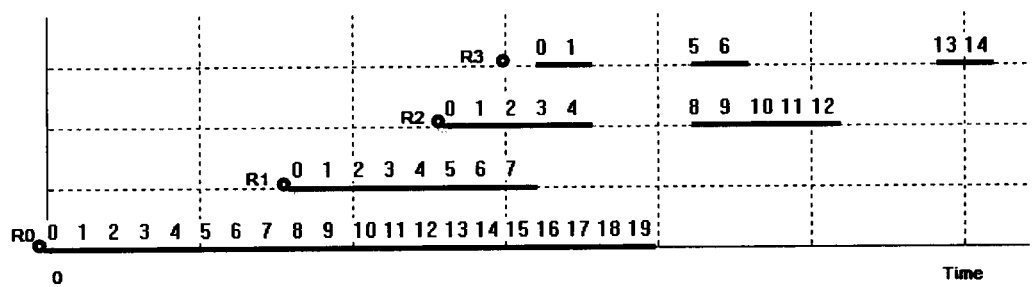
FIGS. 5A and 5B are diagrams showing examples of the 2D finalized schedule and the metadata finalized schedule based on the interim schedules shown in the 4A and 4B according to the embodiment of present invention.
Figure 5B:
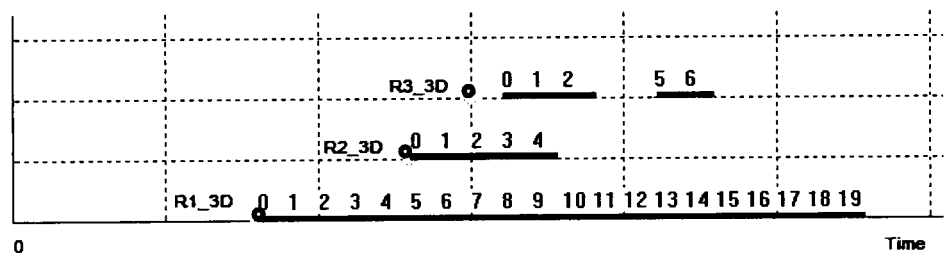

The invention will be further illustrated by examples with FIG. 4A, 4B showing respectively the interim schedule of the 2D part and the interim schedule of metadata part of the 3D content, and with FIGS. 5A and 5B showing respectively the finalized schedule of the 2D part and the finalized schedule of metadata part of the 3D content. In the figures, each small circle denotes a request. The number above the solid line denotes the sequence number of corresponding segment. Both the 2D part and the metadata part are divided into 20 segments. There are 4 requests from clients, one from a 2D client and three from 3D clients. Request from the 2D client is denoted as R0. Requests from the 3D clients are denoted as 2D requests (R1, R2, R3) and metadata requests (R1_3D, R2_3D, R3_3D).

An interim schedule for either the 2D part or the metadata part comprises information indicating which segments of the 2D part or metadata part will be transmitted in a newly created multicast stream, one or more time points indicating when the segments will be transmitted in the newly created multicast stream, and one or more existing multicast streams from which the remaining segments that will not be transmitted in the new multicast stream can be obtained. FIG. 4A shows an example of an interim schedule of the 2D part. The 2D video part is divided into 20 segments with sequence number labeled from 0 to 19. There are 4 requests for 2D video and 3D video occurring at the time point a0, a1, a2 and a3. Taking the R2 request as example with a starting time point corresponding to segment 0, the interim schedule of the 2D part for the R2 client includes information indicating that segments 0 to 4 and 8 to 12 will be transmitted in a new multicast stream, two time points indicating when the segments 0 and 8 will be transmitted. The client R2 can obtain the segments 5 to 7 from the existing multicast stream for the R1 client and the segments 13 to 19 from the existing multicast stream for the R0 client. In other words, for the request R2, the system will not transmit the segments 5 to 7 and 13 to 19 in addition to the existing multicast streams which transmit these segments at earliest at the same time as the transmission of the starting segment 0 in response to the request R2. Therefore the bandwidth usage at the server side is greatly optimized.

The interim schedule includes information indicating, for each segment, when it will be transmitted if it needs transmitting in the new multicast stream and when and where it will be obtained if not. According to a variant, the information about when and in which existing multicast stream(s) the segments will be obtained is not necessary to be included in the interim schedule because the server only cares about when to transmit the segments. However, in order to assist the client to receive the segments conveyed in the existing multicast stream(s), such information may be transmitted to the client separately. Thus, the server 101 may comprise an informing module (not shown in the FIG. 1) for informing the requesting client(s) of such information.

A same method can be used for the determination of the 2D interim schedule and of the metadata interim schedule which are independent of each other. As example, the method described in the WO2008083523 can be used to determine the 2D interim schedule and the metadata interim schedule separately. Regarding the 2D part, the 2D interim schedule may include a first time point for starting delivery of an initial segment of the 2D part (i.e. segment with sequence number of 0 in the FIG. 4A) and one or more subsequent transmission time points for starting delivery of some subsequent segments of the 2D part, wherein the first time point minimizes a delay from receiving the request to starting delivery of the initial segment of the 2D part, and the one or more subsequent transmission time points satisfy the delivery delay limit while also increasing a delay for starting delivery of the subsequent segments of the 2D part. The one or more subsequent transmission time points makes the subsequent segments be transmitted as late as possible so that the subsequent segments can be shared with other requesting clients. However, the subsequent time points shall be selected in such a way that the content received at the client's side can be played continuously, or without unacceptable interruptions.

Taking R3 client in FIG. 4A as example, the 2D interim schedule contains a first time point a3 to start delivery of the segments 0-1 and two subsequent transmission time points respective for starting delivery of segments 5-6 and 13-14. The remaining segments of the 2D part may be obtained from the existing multicast streams (segments 2 to 4 and 8 to 12 from the stream linked to client R2, the segment 7 from the stream linked to R1, and the segments 15 to 19 from the stream linked to client R0). As to the metadata interim schedule, it contains similar content as that in the 2D interim schedule. Assuming the bandwidth is 3*b_2D, which means among the four streams, it is only possible to transmit maximum three segments at same time of simultaneously. In other words, the delivery of the initial segment 0 of the 2D part at time point a3 is not possible, as at the same time, the transmission of the segment 2 for client R2, of the segment 7 for the client R1 and of the segment 15 for the client R0 is happening. It is necessary to delay the delivery of the initial segment 0 for the client R3 at the first possible subsequent time slot (see FIG. 5A where the segment 0 is transmitted at the same time slot as the segment 3 for the client R2 and the segment 16 for the client R0).

Taking R3_3D client (i.e. R3 client) in the FIG. 4B as example, the metadata interim schedule for the R3_3D client contains a first time point (i.e. time point for starting delivery of segment 0 of the metadata part of the 3D content) for the transmission of the segments 0 to 2 and a subsequent transmission time point for starting delivery of the segments 5-6. The remaining segments of the metadata may be obtained from the existing multicast streams (segments 3-4 from the stream linked to client R2_3D, and the segment 7 to 19 from the stream linked to R1_3D). If we make the same assumption for the bandwidth as for the 2D part, the transmission of the three multicast streams will not have problem, and no delay in delivery for the segment 0 of the metadata is necessary.

As the 2D part and the metadata part need working collaboratively to generate the stereoscopic view, the initial transmission of the first segments of the 2D part and metadata part needs synchronizing. Therefore, description below will be more focused on the determination of the first time points for the 2D part and the metadata part in the finalized schedule. In FIG. 5B, the delivery of the initial segment 0 of the metadata part is delayed by one time slot to be synchronized with the delivery of the initial segment 0 of the 2D part. We then obtain the final schedule of the 2D part and of the metadata part for delivery of the 3D content at requested by the client R3_3D.

An experiment is made to evaluate the performance of the invention. Without using the method introduced in the invention, when 720 clients try to request a 2-hour 3D content from a server that has a bandwidth of 6 times video playback rate, only can 6 clients be served. And other clients cannot be served until a client currently being served finishes the content. In the worst situation, it has to wait for 2-hour. However, in the experiment using our invention, a 2-hour 3D content is provided by the VOD server. Both 2D part and metadata part are divided into N blocks, N=7200. Thus each block lasts 1 second. There are 720 clients requesting the 2-hour 3D content by sending requests to the server. These requests arriving at the server follows Poisson distribution, the average arriving interval is 10 s. The bandwidth limit is 6 times video playback rate. In the case of all clients being 3D, the average startup delay is just 17.6 s, and 80% startup delay is less than 30 s, 90% startup delay is less than 50 s.

The 2D or 3D client may request a 2D content (i.e. 2D part) or a 3D content starting from a certain segment other than the initial segment, and the invention is still applicable to this case. Furthermore, the 2D or 3D client may request a 2D content or a 3D content starting from a certain time point other than directly indicating the sequence number of the segment. In this case, the server will determine the starting segments in the 2D part and the metadata part by comparing the received time point and the time points for segments.

The invention claimed is:

1. A method for delivering a 3D content having a 2D part and a metadata part which are divided into equal number of segments and are transmitted in two multicast streams, the method comprising:
receiving a request for the 3D content from a first client device when delivering a non-initial segment of the 2D part of the 3D content in a first multicast stream to a second client device;
transmitting segments from initial segment to the non-initial segment of the 2D part in a second multicast stream and segments from initial segment to end segment of the metadata part in a third multicast stream,
wherein the transmitting further comprises:
determining time points for transmitting the segments from the initial segment to the non-initial segment of the 2D part, determining a delay value for the segments of the 2D part, determining time points for transmitting the segments from the initial segment to the end segment of the metadata part, delaying the time points for transmitting the segments from the initial segment to the non-initial segment of the 2D part by the delay value, and delaying the time points for transmitting the segments from the initial segment to the end segment of the metadata part by the delay value.

2. The method of the claim 1, further comprising having the first client device receive segments from the non-initial segment to end segment of the 2D part from the first multicast stream.

3. A device for delivering a 3D content upon request from a starting time point, the 3D content having a 2D part and a metadata part which are divided into equal number of segments, the device comprising:

a request forking module configured to receive a first request for the 3D content from a first client device, and forward the request to a 2D scheduling module and a metadata scheduling module, wherein the request is received when the device delivers a non-initial segment of the 2D part of the 3D content in a first multicast stream to a second client device;

the 2D scheduling module configured to determine time points for transmitting segments from initial segment to the non-initial segment of the 2D part in a second multicast stream to the first client device, and to determine a delay value for the segments of the 2D part and delaying the time points for transmitting the segments from the initial segment to the non-initial segment of the 2D part by the delay value; and the metadata scheduling module configured to determine time points for transmitting segments from initial segment to end segment of the metadata part in a third multicast stream, and to determine delaying the time points for transmitting the segments from the initial segment to the end segment of the metadata part by the delay value, wherein the request forking module, the 2D scheduling module and the metadata scheduling module are each executed by a processor.

4. The device of the claim 3, further comprising an informing module configured to inform the first client device that segments from the initial segment to the non-initial segment of the 2D part can be obtained from the first multicast stream, wherein the informing module is executed by a processor.

* * * * *